United States Patent [19]
Horn

[11] 3,972,558
[45] Aug. 3, 1976

[54] SUNROOF STRUCTURE

[75] Inventor: Charles G. Horn, West Newton, Mass.

[73] Assignee: Aro Manufacturing Company, Inc., West Newton, Mass.

[22] Filed: Dec. 27, 1974

[21] Appl. No.: 536,814

[52] U.S. Cl. .................... 296/137 B; 49/400; 292/259 A
[51] Int. Cl.² ................................ B60J 7/00
[58] Field of Search ......... 296/137 F, 137 J, 137 B, 296/137 A, 137 R, 137 C; 49/400, 394, 382, 193; 292/259, 338, 339, 262; 52/209; 98/2.14, 2.15

[56] References Cited
UNITED STATES PATENTS

| | | | |
|---|---|---|---|
| 1,962,449 | 6/1934 | Ledwinka | 52/400 |
| 2,025,874 | 12/1935 | Lange | 296/137 C |
| 2,372,164 | 3/1945 | Woodhams | 98/2.14 |
| 2,845,016 | 7/1958 | Steege | 98/2.14 |

FOREIGN PATENTS OR APPLICATIONS

| | | | |
|---|---|---|---|
| 66,875 | 8/1939 | Czechoslovakia | 296/137 J |
| 1,469,621 | 1/1967 | France | 49/400 |

*Primary Examiner*—Albert J. Makay
*Assistant Examiner*—Donald W. Underwood
*Attorney, Agent, or Firm*—Wolf, Greenfield & Sacks

[57] ABSTRACT

The sunroof structure basically comprises a sunroof which is preferably constructed of a plexiglass or acrylic material and a preferably rectangular frame which is suitably supported from the vehicle roof structure and which defines an opening which the sunroof covers. The sunroof is of the pop-out type and a plurality of fasteners secure the sunroof in place to cover the opening. A peripheral gasket, which is preferably attached to the sunroof, provides a seal between the sunroof and the vehicle roof. The sunroof may be either completely removed or can be partially opened by pivoting the sunroof and supporting preferably its back edge by means of a pivotal support arm.

8 Claims, 6 Drawing Figures

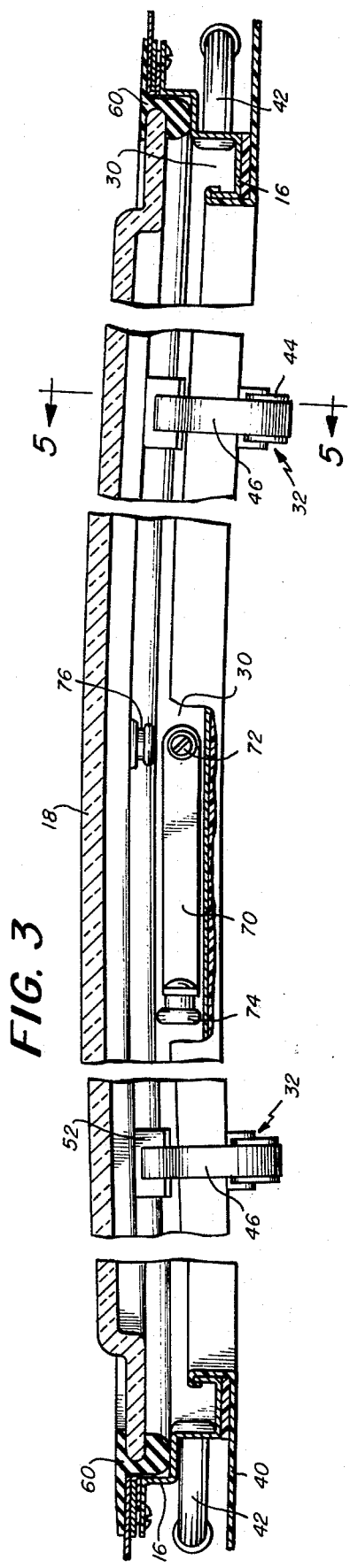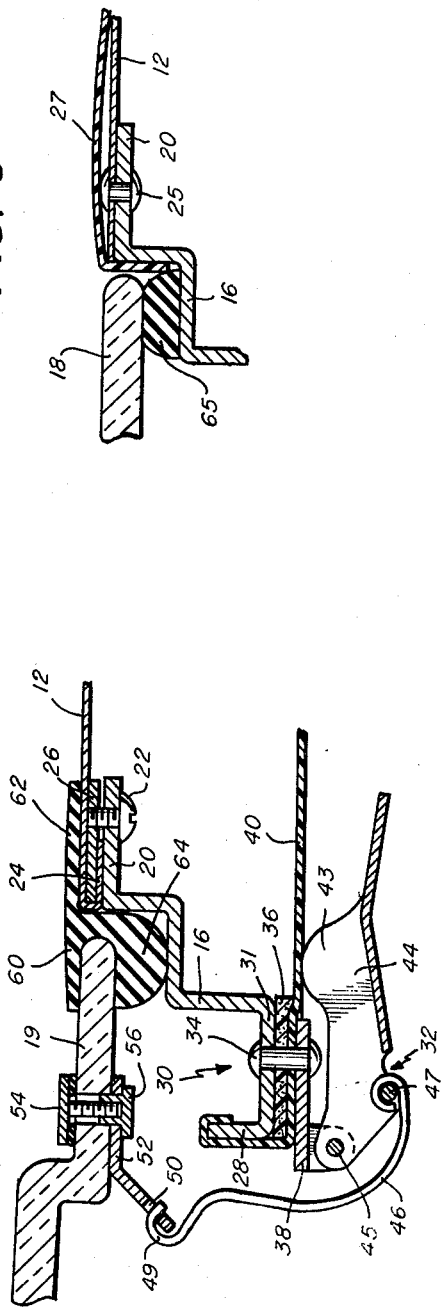

SUNROOF STRUCTURE

BACKGROUND OF THE INVENTION

The present invention relates, in general, to a sunroof structure and more particularly, to a pop-out type sunroof structure. The sunroof structure of the present invention is readily adaptable for use in existing vehicles not now equipped with sunroofs and is very easy to operate.

There are many sunroof structures that now exist and are used in a variety of different types of vehicles. For example, see my copending application Ser. No. 506,736 filed Sept. 16, 1974. Some of these structures, however, are rather complex, may be quite different to install in an existing vehicle, and do not easily provide for partial opening of the sunroof structure.

Accordingly, it is an object of the present invention to provide an improved sunroof structure.

A further object of the present invention is to provide a sunroof structure wherein the sunroof effeciently seals against the vehicle roof when in a closed position and can essentially be locked in this closed position.

Another object of the present invention is to provide a sunroof structure that may be easily partially opened without having to completely remove the sunroof from engagement about its opening.

In accordance with the preceding object it is still a further object of this invention to provide a sunroof that tilts so as to provide a partial opening thereof.

Still a further object of the present invention is to provide a sunroof structure wherein the sunroof is preferably constructed of a plexiglass or acrylic material and has a sealing gasket attached about the periphery thereof.

Still another object of the present invention is to provide a sunroof structure that is relatively simple in design, that is light in weight, that can be manufactured relatively inexpensively, and that can be easily installed in an existing vehicle.

SUMMARY OF THE INVENTION

To accomplish the foregoing and other objects of this invention, there is provided a sunroof structure for use in a vehicle having a roof opening beneath which the majority of the structure is disposed. The structure comprises a frame secured to the vehicle roof and extending about the roof opening, and a sunroof dimensioned to cover the roof opening. A gasket is disposed between the periphery of the sunroof and the edge defining the opening and this gasket is preferably secured to the periphery of the sunroof itself. A plurality of fasteners connect the frame to the sunroof and they may be uncoupled when the sunroof is to be removed from engagement with the frame. The sunroof may also be partially opened in which case some of the fasteners are holding at least an edge of the sunroof closed or in engagement with an edge of the frame. There is additionally provided a supporting arm which supports the opposite edge of the sunroof elevated above the vehicle roof so that the sunroof is in a partially opened position.

BRIEF DESCRIPTION OF THE DRAWINGS

Numerous other objects, features and advantages of the invention should now become apparent upon a reading of the following detailed description taken in conjunction with the accompanying drawings, in which:

FIG. 3 is a cross sectional view taken along line 3—3 of FIG. 2 showing further details of the sunroof structure;

FIG. 5 is a somewhat enlarged fragmentary cross sectional view which is taken along line 5—5 of FIG. 3; and FIG. 6 is a fragmentary cross sectional view showing an alternate gasket sealing arrangement.

DETAILED DESCRIPTION

Figure 1:
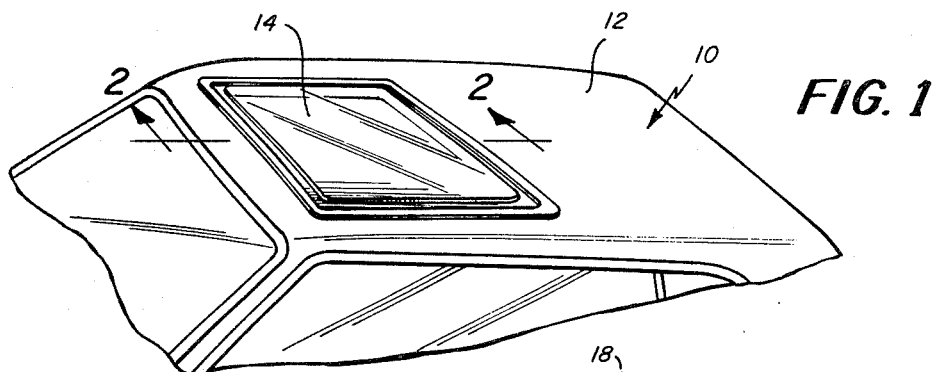
FIG. 1 is a perspective view of a vehicle showing the position of the sunroof structure.

FIG. 1 shows the vehicle 10 having a roof 12 which is provided with an opening for receiving the sunroof structure 14 of the present invention. The sunroof structure 14 may be incorporated into a vehicle at the time that it is manufactured or is easily incorporated into a used vehicle.

Figure 2:
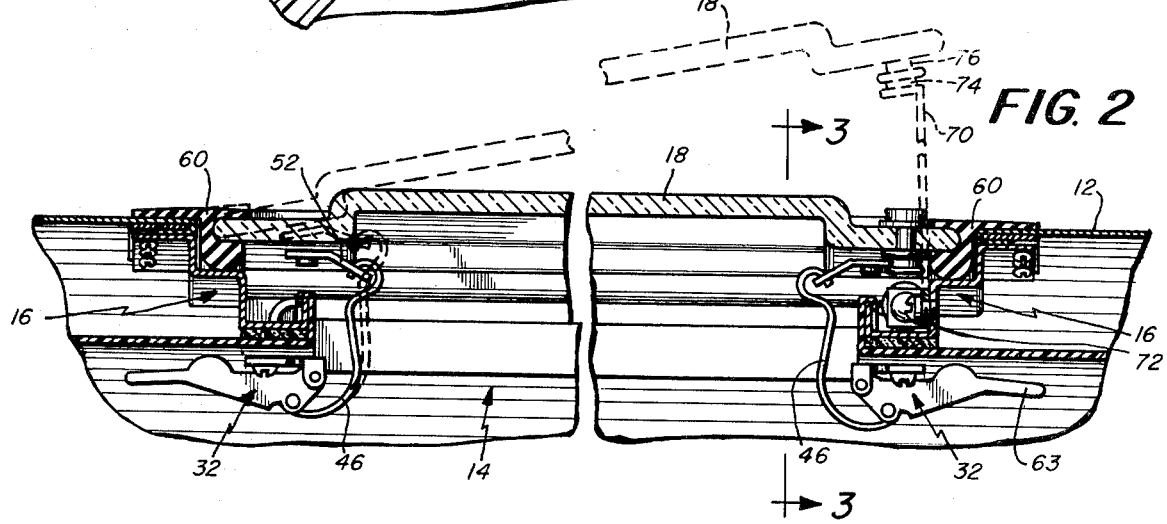
FIG. 2 is a cross sectional view taken along line 2—2 of FIG. 1, showing the sunroof structure in more detail.
Figure 4:
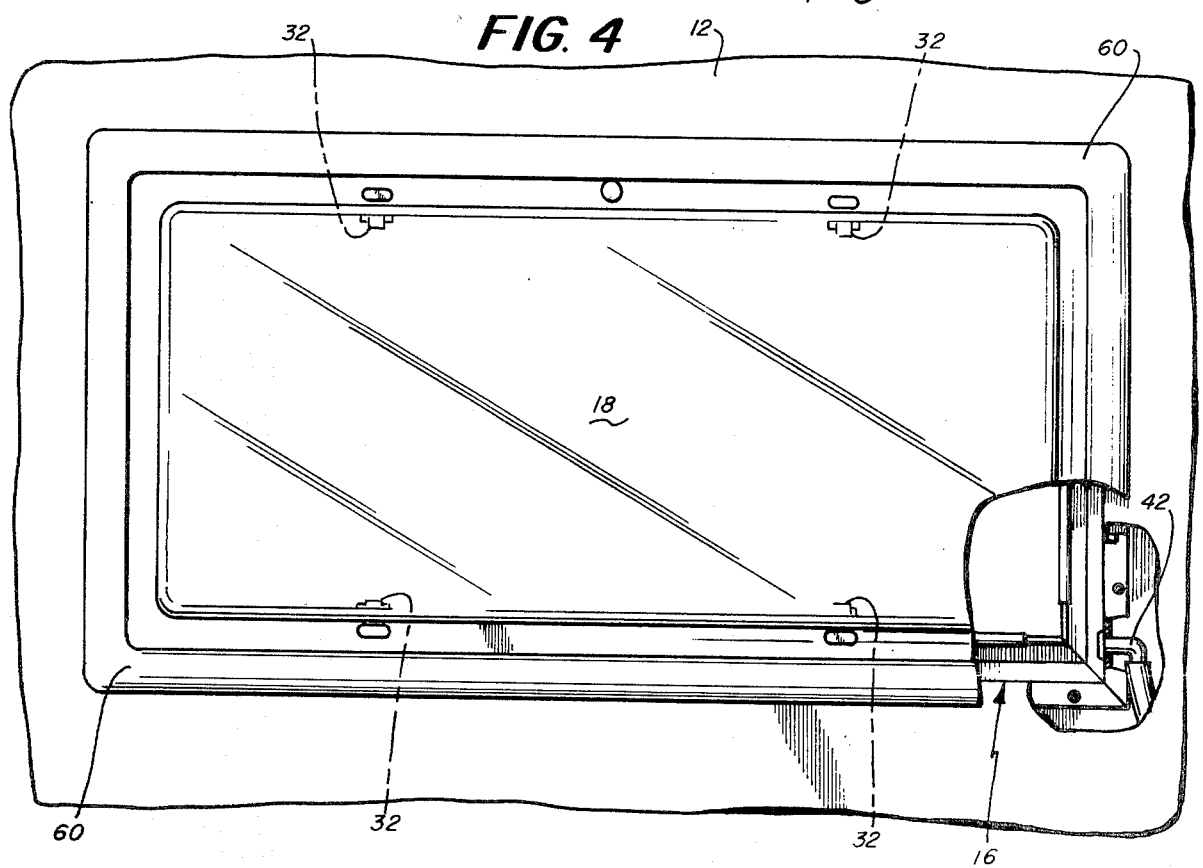
FIG. 4 is a plan view partially cut-a-way of the sunroof structure shown in FIG. 1.

FIG. 2 shows more detail of the sunroof structure 14, the majority of which is disposed below the vehicle roof 12. The sunroof structure generally comprises a frame 16 and a plexiglass or acrylic sunroof 18. FIG. 3, which is a cross sectional view taken along line 3—3 of FIG. 2, shows further detail of the sunroof structure. FIG. 4 is a plan view of the sunroof structure with a section thereof partially cut-a-way. FIG. 5 is a detailed view taken along line 5—5 of FIG. 3 and showing the fastener and gasket seal.

The frame 16, as most clearly shown in FIG. 5, has a stepped cross section including a top flange 20 which may be secured at predetermined distances along the frame by means of a bolt 22. The roof 12 is turned back at 24 about an elongated plate 26 and the lip 20 of the frame is secured by means of the bolt 22 which passes into and may be threaded into the plate 26.

Another arrangement for fastening the frame 16 to the vehicle roof 12 is shown in FIG. 6 wherein a rivet 25 is used that extends through both the lip 20 and the roof 12. This arrangement is particularly suited for use with a vinyl cover 27 which covers the head of the rivet 25 and extends downwardly at its end. Although FIG. 5 shows a cross sectional view only at one point in the structure, it is understood that the plate 26 extends about the whole opening and is thus in the form of a rectangular plate with the roof cut and bent as shown in FIG. 5 about the plate 26.

The lower end of frame 16 is turned up at 28 to form a gutter 30 having a bottom wall 31. The fastener 32 is secured by means of a rivet 34 to wall 31. A resilient strip 36 wedges between the wall 31, the support plate 38 for the fastener, and the inside roof head liner 40 which may be glued to the end 28 of the frame, as shown most clearly in FIG. 5.

Although the sunroof is sealed by a gasket to the vehicle roof, there is a possibility that water may leak therebetween in which case this water would be collected in the gutter 30. In order to expel this water from the gutter, there is provided a plurality of vents 42 which are shown in FIG. 3 and in the cut-a-way section of FIG. 4. These vents can carry water from the gutter off to a place where it can be expelled from the vehicle.

As shown in FIG. 4, there are preferably four fasteners 32 the details of which are shown in FIGS. 2, 3 and 5. Referring now, in particular, to FIG. 5, the fastener 32 generally comprises a support plate 38, a latch 44, and a curved spring 46. The support plate 38 has means defining a pivot point 45 about which the latch 44 can pivot. The spring 46 fastens at one end to pin 47 and has a hooked end 49 which engages with slot 50 in catch member 52. In FIG. 5 the fastener 32 is shown in its locked position with the latch 44 rotated counter-clockwise about pivot 45 so that the raised portion 43 of the latch contacts the head liner 40. In that position the spring 46 in its tensioned position, pulling the catch member 52 downwardly and sealing the sunroof against the vehicle roof.

The catch member 52 is secured to the flange 19 of the sunroof by means of a suitable fastening arrangement shown in FIG. 5 as including a screw 54 and a nut 56. This arrangement securely holds the catch member 52 against the bottom surface of the flange 19 of the sunroof.

FIG. 5 also shows the sealing gasket 60 which peripherally extends, as shown in FIG. 4, about the entire sunroof. The gasket seal 60 fits about the end of the flange 19 and includes an outwardly extending end 62 and a hemispherical bottom 64. The gasket 60 and the frame 16 are constructed so that as the fasteners 32 are moved to their closed position, the lower end 64 of the gasket securely seals against the frame 16 as the outwardly extending end 62 seals against the roof 12 thereby providing a two-fold seal.

FIG. 6 shows an alternate sealing arrangement. In FIG. 6 there is shown just a fragmentary end of the sunroof 18. The gasket 65 shown in FIG. 6 is an oval gasket or hemispherical gasket that is secured to the frame 16 rather than to the sunroof structure.

In accordance with the present invention, it is desirable to partially open the sunroof to the position shown in dotted in FIG. 2. In this view, of course, the front of the vehicle is to the left and thus with the sunroof open in this manner, the wind forces on the vehicle as it is moving would not tend to lift the sunroof off and possibly damage the structure. In order to provide this type of operation, two of the fasteners 32 would be maintained in engagement with their respective catch members 52. In FIG. 2 the fasteners that are maintained in this position would be the fasteners on the left. The opposite two fasteners on the right, as viewed in FIG. 2, can be disengaged from their respective catch members by pulling down on flange 63 with the fingers thereby relieving the tension from the spring 46 and permitting the hooked end 49 to disengage from the hole 50 in the catch member. Once the two right hand fasteners, as viewed in FIG. 2, have been disengaged then the sunroof 18 can be tilted to the position shown in dotted in FIG. 2. In order to support the sunroof in that position, there is provided an arm 70 pivotally secured to the frame by bolt 72. The arm 70 when not in use is pivoted to the position shown in FIG. 3 so that it lies within the gutter 30. FIG. 3 also shows the end 74 of the arm 70 which may be a rubber member. The end 74 is adapted to engage with the button 76. This button 76 is secured to the flange 19 of the sunroof by a suitable means such as a bolt extending downwardly through the flange 19.

As previously mentioned, FIG. 2 shows in phantom, the position of the arms 70 with its end 74 resting against the button 76 so as to hold the sunroof 18 in the position shown. When the sunroof is pivoted upwardly, the fasteners that are still connected tend to serve as a pivot point and as the sunroof is lifted, the tension in their springs 46 increases so that when the arm 70 is elevated to the proper position, there is a substantial downward force which tends to maintain the arm 70 in place. The end of the arm 74 and the button 76 could actually be mating suction cups that would provide for even more stable support for the sunroof 18.

Having described one preferred embodiment of the present invention, it should now be apparent that one skilled in the art can make numerous modifications in the structures disclosed herein and that all such modifications and different embodiments thereof are contemplated as falling within the spirit and scope of the present invention. For example, the sunroof 18 can be fabricated of many different types of material. Also, there are numerous other types of securing means that can be used in place of those shown, such as in place of the bolt 22, shown in FIG. 5. Spot welding could even be used in place of the bolt 22.

What is claimed is:

1. A sunroof structure for a vehicle having a roof opening, said structure comprising;
    a frame secured to the vehicle roof and extending about the roof opening,
    a sunroof dimensioned to cover said roof opening,
    gasket means disposed between the peripheral edge of the sunroof and the edge defining the opening,
    a plurality of fasteners connected to the frame and coupled to the sunroof to hold the peripheral edge of the sunroof closed against the vehicle roof,
    each said fastener including flexible spring means,
    at least one of said fasteners disposed on one side of the sunroof and at least another one of said fasteners disposed on an opposite side of the sunroof,
    said one fastener remaining attached to the sunroof and said flexible spring means of said one fastener forming a pivot for the sunroof with the other fastener disengaged from the sunroof to permit the opposite side of the sunroof to be raised,
    and means for supporting the opposite side of the sunroof above the vehicle roof so that the sunroof is partially opened.

2. A sunroof structure as set forth in claim 1 wherein said frame includes means defining a gutter and said means for supporting includes an arm secured to said frame and adapted to lie in said gutter when said sunroof is totally closed against the vehicle roof and assumes a substantially vertical position having an end contacting the sunroof to partially elevate the sunroof above the vehicle roof.

3. A sunroof structure as set forth in claim 2 wherein said plurality of fasteners includes four fasteners, two on each opposite front and rear side of the sunroof.

4. A sunroof structure for a vehicle having a roof opening, said structure comprising;
    a frame secured to the vehicle roof and extending about the roof opening,
    said frame including means defining a gutter,
    a sunroof dimensioned to cover said roof opening,
    gasket means disposed between the periphery of the sunroof and the edge defining the opening,
    four fasteners, two on each of the opposing front and rear sides of the roof,
    each said fastener including spring means such that with two of the fasteners disengaged from the same side of the sunroof the edge of that side of the sunroof is freed to be raised and with the other two fasteners remaining attached to the sunroof and their respective spring means functioning as a pivot for the sunroof when it is raised, and means for supporting the edge of that side of the sunroof which is raised above the vehicle roof so that the sunroof is partially opened, said means for supporting including an arm secured to said frame and adapted to lie in said gutter when said sunroof is totally closed against the vehicle roof and assumes a substantially vertical position having an end contacting the sunroof to partially elevate the raised side of the sunroof above the vehicle roof.

5. A sunroof structure as set forth in claim 4 wherein the sunroof includes a plurality of catch members secured thereto for receiving the fasteners.

6. A sunroof structure as set forth in claim 5 wherein said gasket means includes a resilient gasket secured to the edge of the sunroof and having a lower portion sealing against the frame and an upper portion sealing against the vehicle roof.

7. A sunroof structure as set forth in claim 1 wherein said gasket means is secured to the peripheral edge of the gasket and has a lower portion sealing against the frame and an upper portion sealing against the vehicle roof.

8. A sunroof structure as set forth in claim 7 wherein said frame is stepped and the lower portion of the gasket means contacts one of the steps of the frame and the upper portion of the gasket means extends outwardly from the sunroof over the vehicle roof.

* * * * *